April 15, 1958 — R. E. BECKER — 2,830,823
JAW CHUCK ASSEMBLY
Filed May 18, 1955 — 2 Sheets-Sheet 1
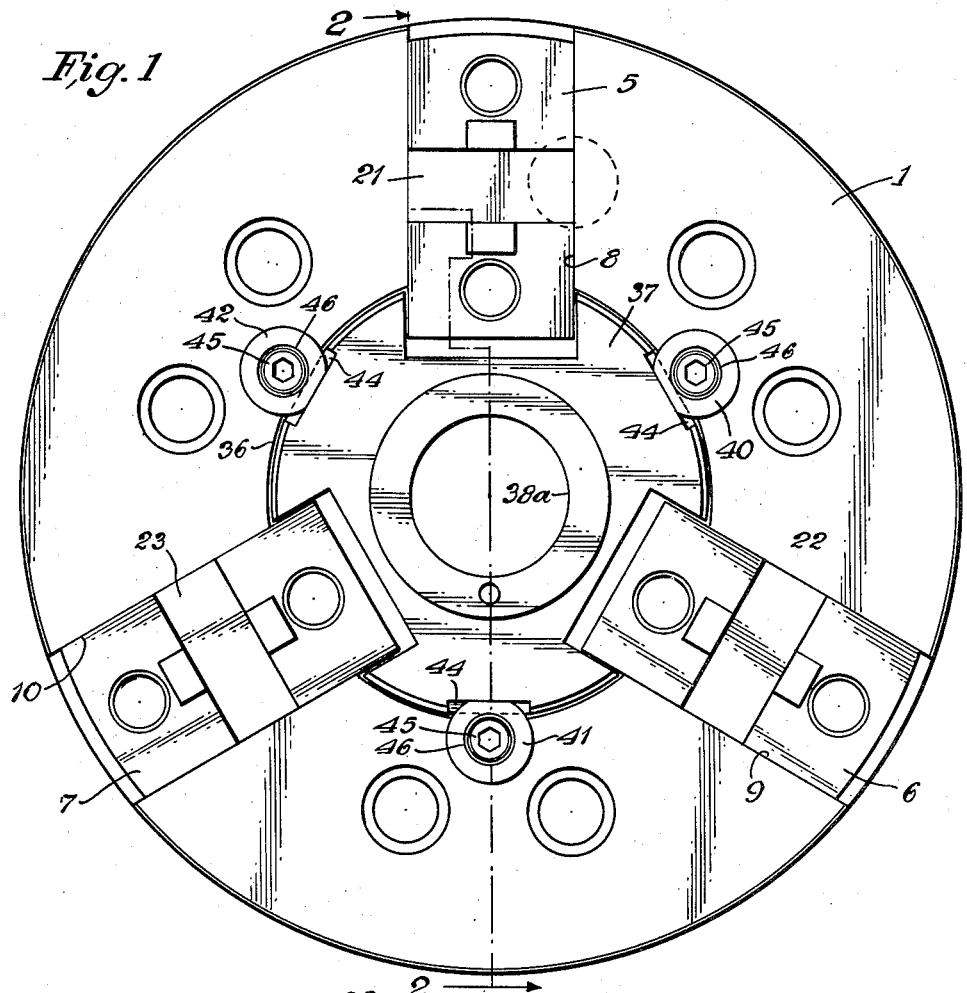
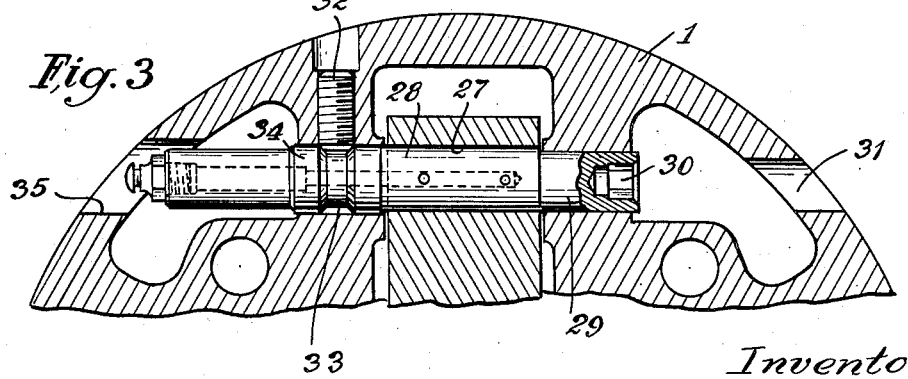
Inventor
Robert E. Becker
by Parker & Carter
Attorneys

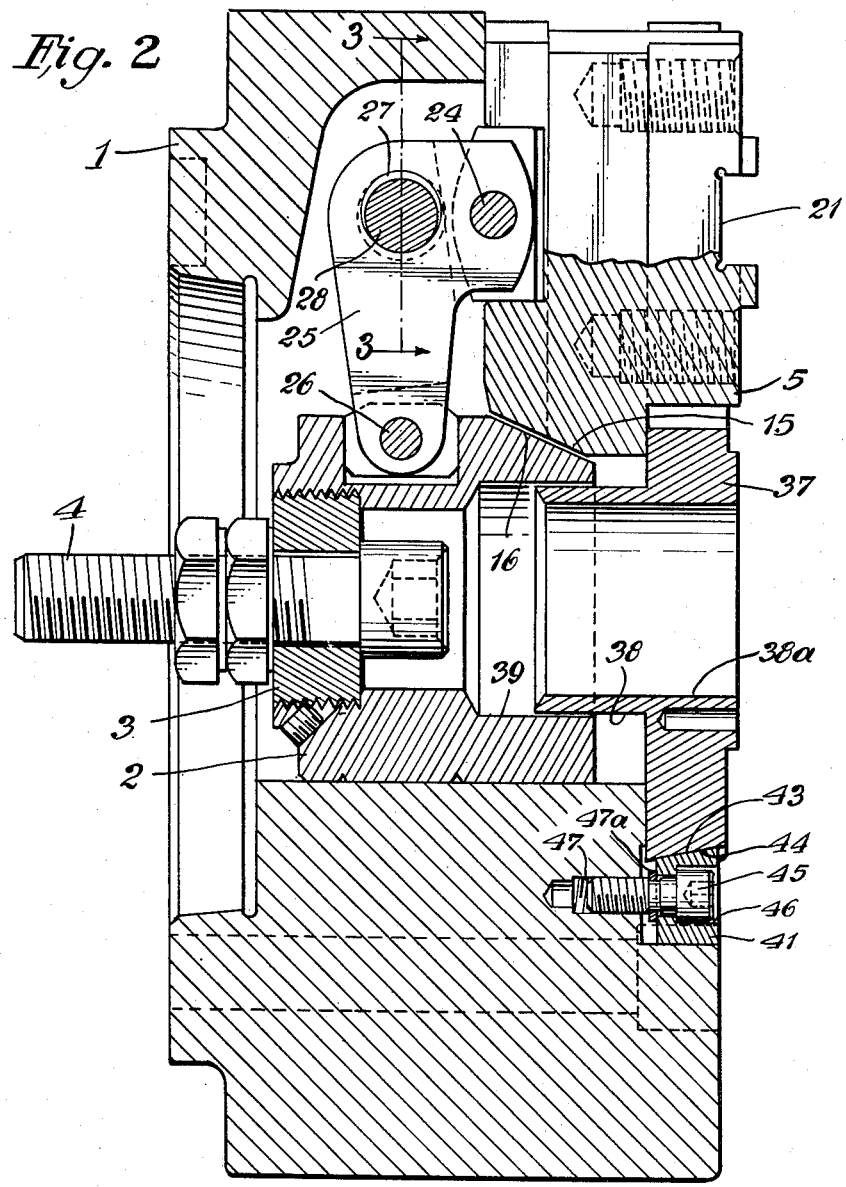
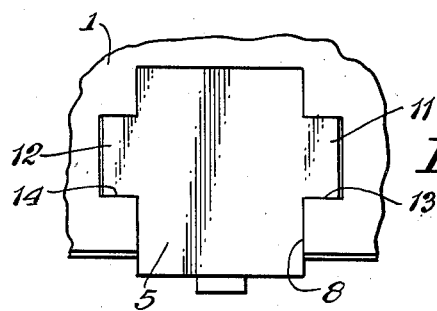

United States Patent Office 2,830,823
Patented Apr. 15, 1958

2,830,823

JAW CHUCK ASSEMBLY

Robert E. Becker, Logansport, Ind., assignor to Logansport Machine Company, Inc., a corporation of Indiana Application May 18, 1955, Serial No. 509,301

2 Claims. (Cl. 279—110)

This invention is directed to certain new and useful improvements in machine tool chucks.

One object of the present invention is the provision of a novel and efficient work holding structure for machine tool chucks which is so formed as to compensate for manufacturing tolerances in the chuck and allows an accurate centering of work pieces supported by the chuck with relation to the machine tool spindle on which the chuck is mounted.

Another object of the present invention is the provision of improved supporting means for the jaws of a machine tool chuck.

Another object of the present invention is the provision of a new and improved center plate assembly for machine tool chucks.

Other objects will appear from time to time in the course of the ensuing specification and claims.

Referring generally now to the drawings:

Figure 1 is a front elevation of the improved chuck forming the present invention;

Figure 2 is a sectional view of the chuck shown in Figure 1 taken along the section lines 2—2 of Figure 1;

Figure 3 is a sectional view of certain details of the chuck shown in Figure 2 looking in the direction of the arrows 3—3 of Figure 2; and Figure 4 is a detail view in plan of one of the movable jaws of the chuck and its support.

Like elements are designated by like characters throughout the specification and drawings.

Referring specifically now to the drawings and in the first instance to Figure 1. 1 designates the chuck body which in overall shape and configuration is generally cylindrical. As will be seen best in Figure 2, the central portion 2 of the chuck is provided with the customary threaded fitting 3 which allows attachment of the chuck to a machine tool spindle. As is customary practice, the chuck body 1 is adapted for rotation about the axis of the attaching bolt 4 which forms a part of the fitting 3.

A plurality of work-holding jaws 5, 6 and 7 are mounted on the forward face of the chuck. As is seen best in Figure 1 these jaws are equidistantly spaced about the central axis of the chuck and are adapted for a slight degree of movement toward and away from the center of the chuck through their mounting in slots 8, 9 and 10 respectively, formed in the forward face of the chuck body. Each of these jaws is also mounted for motion along lines generally parallel to the central axis of the chuck. Each of the jaws is provided with outwardly extending projections 11 and 12 which are adapted to abut against the walls 13 and 14 of slots formed in the chuck body. Thus the forward movement of the jaws is limited by the walls 13 and 14.

Each of the jaws has an inclined surface 15 which extends upwardly and rearwardly from the forward portion of the chuck. These inclined portions 15 are opposed to inclined portions 16 in the central portion of the chuck.

Each of the chuck jaws 5, 6 and 7 are provided with the customary lock slots 21, 22 and 23 respectively.

The rearward portion of each jaw is pivotally connected as by means of a pivot pin 24 with a lever 25 which is in turn pivotally connected as by means of a pivot pin 26 with the central portion of the chuck. The lever 25 is provided with a bore 27 which extends through the lever along a line generally parallel to the axes of the pins 24 and 26. A fulcrum pin 28 is journaled for rotation in the chuck body as at 29 and extends through the bore 27. That portion of the pin 29 passing through the bore 27 is formed on a greater radius than the end of the pin shown at the right of center in Figure 3. Preferably the portion 29 is circular in cross section but its axis is offset from the main axis of the pin 28. Thus during rotation of the pin 28 about its axis, the slight degree of eccentricity afforded by the portion 28 will move the lever 25 counterclockwise or clockwise about the axis of the pin 26 as seen in Figure 2 depending upon the direction of rotation of the pin 29.

The wrench receiving aperture 30 may be provided in the end of the pin 29 and generally aligned with an aperture 31 in the main body portion of the chuck. Thus to rotate the pin 28, a wrench may be inserted through the aperture 31 and engaged with the recess 30 to accomplish rotation of the pin 28.

A set screw 32 may be inserted through the body of the chuck and engaged with a peripherally extending recess 33 in the pin so as to lock the pin 28 in a given angular position. It should be noted that the left-hand side of the pin 28 at its point of bearing contact with the body of the chuck as at 34, is made sufficiently large to allow complete withdrawal of the pin 28 through the aperture 35 formed in the chuck.

A central recess defined by the rim 36 is formed in the forward face of the chuck. As will be seen in Figure 1 the inner portions of the movable jaws extend into this recess. A removable center plate 37 is fitted into this recess and is provided with a hub 38 which extends into a bore 39 which is coaxial with the bolt 4. The center plate 37 has a central bore 38a which is adapted to accommodate work pieces or portions thereof.

According to my invention, I provide means for adjusting this center plate in a plane extending transversely to the axis of the chuck. This means includes a plurality of blocks 40, 41 and 42 which are equally spaced about the axis of the chuck. As will be seen best in Figure 2, each of these blocks has an inclined surface 43 which is inclined outwardly and rearwardly from the center of the face of the chuck. This surface cooperates with a corresponding inclined surface 44 on the external periphery of the center plate. Each of the retaining blocks 40, 41 and 42 are held in position by a bolt 45, the head of which is received in a recess 46 in the blocks. Each of the bolts 45 is threaded into the body of the chuck as at 47. A snap ring 47a is positioned on each bolt 47 to retain the bolts in the assembled position on the blocks 40, 41 and 42. By threading the bolt 45 inwardly the result is to force the center plate inwardly. By a selected adjustment of each of the bolts 45 and the blocks 40, 41 and 42, the axis of the center plate is adjusted with relation to the axis of the bolt 4.

In the normal use of a machine tool chuck, the normal manufacturing tolerances will provide some variation between the true axis of the chuck and the axis of the spindle which drives the chuck. With the present invention these tolerances are adequately compensated. The aperture 38a of the center plate may be adjusted until its axis is coaxial with the axis of the spindle. The retaining blocks serve not only to hold the removable center plate in position but provide a most convenient means for accomplishing this adjustment. At the same time the lock slots 21 of the jaws may be adjusted inwardly or outwardly with relation to the axis of the chuck by means of the eccentric pin 28. Under some circumstances "false" jaws may be mounted in the lock slots to accommodate the chuck to varying sizes and types of work pieces. With the false jaws so mounted in the lock slots the supporting lever 25 may be adjusted so as to give the false jaws the desired special position with respect to the axis of the center plate and the axis of the spindle.

Whereas I have shown and described an operative form of my invention, I wish it to be understood that this showing is to be taken in a diagrammatic or illustrative sense only. There are many modifications of the invention that will fall within the spirit of the invention which will be apparent to those skilled in the art. The scope of the invention, therefore, should be limited only by the scope of the hereinafter appended claims.

I claim:

1. A removable center plate for machine tool chucks including a generally cylindrical body adapted for insertion in a machine tool chuck, said body having a central bore extending therethrough and a hub extending rearwardly from said body, the periphery of said body being provided with a plurality of spaced, inclined wedging surfaces.

2. A machine tool chuck assembly including a chuck body and a recess formed on the face of said chuck at the central portion of said chuck, a removable plate inserted in said recess, said plate having a central aperture, a plurality of blocks spaced about the axis of said chuck and having wedging surfaces cooperating with wedging surfaces formed on the periphery of said plate, and an adjusting bolt extending through each of said blocks into the body of said chuck.

References Cited in the file of this patent

UNITED STATES PATENTS

| | | |
|---|---|---|
| 1,839,401 | Lewis | Jan. 5, 1932 |
| 2,470,720 | Proctor | May 17, 1949 |
| 2,513,606 | Wahnish | July 4, 1950 |
| 2,639,157 | Buck et al. | May 19, 1953 |

FOREIGN PATENTS

| | | |
|---|---|---|
| 60,084 | Austria | July 10, 1913 |